US012741392B2

(12) United States Patent
Haiping et al.

(10) Patent No.: US 12,741,392 B2
(45) Date of Patent: Sep. 22, 2026

(54) BEARING TYPE HANDLE ROLLER CUTTER

(71) Applicant: Specialty Product Sales, Inc, Gainesville, GA (US)

(72) Inventors: Liao Haiping, Dongguan City (CN); Brint Fanizza, Gainesville, GA (US)

( * ) Notice: Subject to any disclaimer, the term of this patent is extended or adjusted under 35 U.S.C. 154(b) by 0 days.

(21) Appl. No.: 19/421,020

(22) Filed: Dec. 16, 2025

(65) Prior Publication Data

US 2026/0102936 A1 Apr. 16, 2026

Related U.S. Application Data

(63) Continuation-in-part of application No. 18/503,742, filed on Nov. 7, 2023, now abandoned.

(51) Int. Cl.
*B26B 25/00* (2006.01)

(52) U.S. Cl.
CPC .................................. *B26B 25/005* (2013.01)

(58) Field of Classification Search
CPC .................................................... B26B 25/005
See application file for complete search history.

(56) References Cited

U.S. PATENT DOCUMENTS 657,200 A * 9/1900 Melvin .................. A01B 23/06 384/460
2,276,365 A * 3/1942 Angel ................... B26B 25/005 30/265
3,905,432 A * 9/1975 Mullins ................... E21B 10/20 175/323
4,001,935 A * 1/1977 Krohn ..................... C03B 37/16 30/180
4,086,698 A * 5/1978 Sparks .................... B26B 29/02 30/2
4,301,594 A * 11/1981 Okada .................. B26B 25/005 30/292
4,601,103 A * 7/1986 Sugiyama ............ B26B 25/005 30/162
D288,522 S * 3/1987 Salem .............................. D8/98
4,791,928 A * 12/1988 Berke .................... A61B 17/32 606/180
4,887,598 A * 12/1989 Berke .................... A61B 17/32 606/176

(Continued)

FOREIGN PATENT DOCUMENTS

EP 2316621 B1 5/2011

*Primary Examiner* — Sean M Michalski
(74) *Attorney, Agent, or Firm* — Jeremy A. Briggs

(57) ABSTRACT

An apparatus including a handle body, a bearing, a circular blade, and a screw assembly is disclosed. The handle body may include upper and lower covers that may be attached to each other. A proximal portion of the lower cover may include a first through-hole. The bearing may be disposed in the first through-hole. The bearing may include inner and outer walls that may rotate relative to each other. The outer wall may be connected to walls of the first through-hole. The circular blade may include a second through-hole. The screw assembly may include a screw and a nut. The screw may pass through the first and second through-holes, and attach to the nut. The screw's exterior surface connects to the inner wall, and the screw applies a tangential force on the inner wall causing it to rotate relative to the outer wall when the circular blade is rotated.

18 Claims, 10 Drawing Sheets

(56) References Cited

U.S. PATENT DOCUMENTS

| | | | | |
|---|---|---|---|---|
| 5,101,564 | A * | 4/1992 | Melter | B26B 25/005 30/292 |
| 5,251,378 | A * | 10/1993 | Ayer | B26B 25/005 30/132 |
| 5,299,355 | A * | 4/1994 | Boda | B26B 5/003 30/162 |
| 5,355,588 | A * | 10/1994 | Brandenburg, Jr. | B26B 29/02 30/292 |
| 5,440,813 | A * | 8/1995 | Roskam | B26B 13/285 30/267 |
| 5,447,086 | A * | 9/1995 | Wittmaier | B26D 7/2621 83/676 |
| 5,493,781 | A * | 2/1996 | Saito | B26B 25/005 30/162 |
| 5,569,285 | A * | 10/1996 | Webb | B26B 25/005 606/180 |
| 5,628,116 | A * | 5/1997 | Kohno | B26B 13/28 30/267 |
| 5,633,769 | A * | 5/1997 | Kinoshita | G11B 33/14 360/99.04 |
| 5,866,064 | A * | 2/1999 | Teruhisa | F27D 3/026 432/250 |
| 5,881,624 | A * | 3/1999 | Brugue | B26D 1/185 83/485 |
| 5,890,290 | A * | 4/1999 | Davis | B26B 29/02 30/162 |
| 6,021,826 | A * | 2/2000 | Daniell | B27G 19/003 403/292 |
| 6,070,326 | A * | 6/2000 | Berns | B26B 29/02 30/294 |
| 6,161,290 | A * | 12/2000 | Takamasa | B26B 5/003 30/162 |
| 6,178,640 | B1 * | 1/2001 | Votolato | B26B 27/005 30/294 |
| 6,233,832 | B1 * | 5/2001 | Berns | B26B 5/00 30/162 |
| 6,327,783 | B1 * | 12/2001 | Ming | B26B 25/005 30/286 |
| 6,484,405 | B1 * | 11/2002 | Martelli | B26B 25/005 30/292 |
| 6,637,112 | B2 * | 10/2003 | Davis | B26B 27/005 30/162 |
| 6,643,936 | B2 * | 11/2003 | Carlson | B26B 25/005 30/162 |
| 7,073,263 | B2 * | 7/2006 | Kawasaki | B26B 25/005 30/292 |
| D536,231 | S * | 2/2007 | Kawasaki | D8/98 |
| 7,216,432 | B2 * | 5/2007 | Poteet | B26B 25/005 30/142 |
| 7,363,710 | B2 * | 4/2008 | Kortleven | B26B 25/005 30/143 |
| 8,046,922 | B2 * | 11/2011 | Eby | B26B 25/005 30/286 |
| 8,590,163 | B1 * | 11/2013 | Bagley | B26B 25/005 30/286 |
| 8,684,571 | B1 * | 4/2014 | Alaura | E01F 9/685 362/431 |
| 8,938,883 | B2 * | 1/2015 | Gringer | B26B 1/048 30/155 |
| 9,656,402 | B2 * | 5/2017 | Roth | B26B 25/005 |
| 9,827,686 | B2 * | 11/2017 | Raymond | B26B 29/00 |
| 10,207,414 | B2 * | 2/2019 | Groeneweg | B26B 5/003 |
| 10,807,262 | B1 * | 10/2020 | Willmoth | B26B 25/005 |
| 11,833,701 | B2 * | 12/2023 | Huesman | B26B 25/005 |
| D1,054,824 | S * | 12/2024 | Yao | D8/98 |
| 12,226,924 | B2 * | 2/2025 | Wayment | B26B 25/005 |
| 2002/0023355 | A1 * | 2/2002 | Fujita | B26B 13/28 30/341 |
| 2005/0086811 | A1 * | 4/2005 | Kawasaki | B26B 29/00 30/162 |
| 2006/0168822 | A1 * | 8/2006 | Kaye | B26B 13/28 30/341 |
| 2007/0022615 | A1 * | 2/2007 | Tsai-Lian | B26B 25/005 30/319 |
| 2007/0028461 | A1 * | 2/2007 | Chen Lin | B26B 25/005 30/319 |
| 2008/0010839 | A1 * | 1/2008 | Eby | B26B 25/005 30/319 |
| 2009/0183378 | A1 * | 7/2009 | Eby | B26B 25/005 30/391 |
| 2010/0122617 | A1 * | 5/2010 | Mori | H10P 72/0428 83/491 |
| 2011/0167647 | A1 * | 7/2011 | Gringer | B26B 1/046 30/155 |
| 2011/0192034 | A1 * | 8/2011 | Holcomb | B26B 25/005 30/286 |
| 2012/0311872 | A1 * | 12/2012 | Wang | A01G 3/02 30/252 |
| 2015/0101198 | A1 * | 4/2015 | Yagyu | B26B 13/285 30/261 |
| 2015/0128427 | A1 * | 5/2015 | Linn | B26B 13/04 29/446 |
| 2019/0061189 | A1 * | 2/2019 | Chang | B26B 25/005 |
| 2019/0240853 | A1 * | 8/2019 | Mortensen | B26B 21/185 |
| 2022/0347877 | A1 * | 11/2022 | Huesman | B26D 7/2621 |
| 2023/0044800 | A1 * | 2/2023 | Wayment | B26B 25/005 |
| 2024/0066735 | A1 * | 2/2024 | Aldous | B26B 25/005 |
| 2025/0144832 | A1 * | 5/2025 | Haiping | B26B 25/005 |

* cited by examiner

BEARING TYPE HANDLE ROLLER CUTTER

CROSS REFERENCE TO RELATED APPLICATIONS

This application is a continuation-in-part application of co-pending prior U.S. patent application Ser. No. 18/503,742, filed Nov. 7, 2023, which is hereby incorporated by reference herein in its entirety.

FIELD

The present disclosure relates to a technical field of handle roller cutters, in particular to a bearing type handle roller cutter.

BACKGROUND

Handle roller cutters are widely used for cutting needs. A conventional roller handle cutter generally rotates by friction between a blade and a handle shaft. The roller handle cutter is designed to accommodate human factors that address the different ways people use the roller handle cutter. Depending on user's physical abilities, the roller handle cutter may be used with varying downward pressure to the cutting surface, which may result in varying friction between the blade and a screw rod, different degrees of natural wear, and varying friction between a hook groove and screw rod. The varying pressures in use often result in an unpredictable service life of the conventional roller handle cutter and can adversely affect cutting accuracy and material waste. These factors may reduce the practicability of the handle roller cutter and cause inconvenience to the users.

SUMMARY

In view of the problems existing in the prior art, the utility model or the present disclosure provides a bearing-type handle roller cutter, which has the advantages of improving service life and cutting accuracy and addresses the deficiencies of conventional roller handle cutter knife systems having a roller that rotates axially through the friction fit between the blade and the handle shaft.

The utility model or the present disclosure is realized in the following way. The bearing-type handle roller cutter includes a handle body, the inside of the handle body is movably connected with a movable bracket, the bottom of the inner cavity of the handle body is provided with a rigid frame, and the rear side of the fixed frame is fixedly connected to a fixed tube. The rear side of the movable bracket is fixedly connected with a push block, the bottom of the movable bracket is fixedly connected with a protective disk, the front side of the protective disk is movably connected with a cutter disk or cutter head, and the rear of the cutter disk is fixedly connected to a bearing. The rear side of the bearing extends and penetrates into the inner cavity of the fixed tube, and an outer ring of the bearing is fixedly connected with the cutter head. The front side of the rigid frame is movably connected with a first fixed cap, and the rear side of the protective disk is movably connected with a second fixed cap.

In one embodiment, the opposite sides of the first fixed cap and the second fixed cap both extend to the inner ring of the bearing and are movably connected by threads.

In one embodiment, the rear side of the protective disk is provided with a moving hole for use with a fixed tube, and the rear side of the fixed tube passes through the moving hole and extends to the rear side of the protective disk.

In one embodiment of the present disclosure, the rear side of the handle body is provided with a movable hole used in conjunction with the movable bracket, and the rear side of the movable bracket passes through the movable hole and extends to the rear side of the handle body.

In one embodiment of the present disclosure, the top of the movable bracket is fixedly connected with a spring, and the top of the spring is fixedly connected with the top of the inner wall of the movable hole.

Compared with the prior art, the beneficial effects of the present disclosure are as follows:

The utility model or the present disclosure uses the handle body, the push block, the spring, the bearing, the protective disk and the cutter head in cooperation. The push block is pushed to expose the cutter head for cutting. The spring helps to push the movable bracket and reset after cutting. The automatic reset protection solves the deficiencies of conventional roller handle cutters whereby it rotates through the friction between the blade and the handle shaft. The bearing-type handle roller cutter with the advantages of improved service life and cutting accuracy.

In the utility model or the present disclosure, the bearing and the cutter head can be limited by arranging the first fixed cap and the second fixed cap, and the cutter head can be quickly installed and uninstalled by disassembling the first fixed cap and the second fixed cap.

The utility model or the present disclosure is provided with a sealed bearing that limits the moving range of the protective disk during the moving process of the protective disk, thereby avoiding the phenomenon of jamming the protective disk.

By setting the movable hole, the movable bracket drives to move in the inner cavity of the movable hole during the movement of the push block, which ensures the smoothness of the movable bracket when moving, and facilitates the user to adjust the position of the protective disk.

By setting the spring, the movable bracket drives the spring to be elastically deformed. The movable bracket can be automatically reset by the spring deformation, so that the cutter head can be automatically reset, which ensures that the cutter head is protected from accidentally touches and improves the safety.

In accordance with another embodiment of the present disclosure, an apparatus or a bearing-type handle roller cutter is disclosed that includes a handle body, a bearing, a circular blade, and a screw assembly. The handle body may include an upper cover and a lower cover that may attach with each other via one or more fasteners or via interference fit. The lower cover includes a through-hole ("first through-hole") that may receive a bearing. The bearing may be a deep groove ball bearing having an inner wall and an outer wall that rotate relative to each other. The outer wall of the bearing may be attached (via friction or interference fit) with the walls associated with the first through-hole.

The screw assembly may include a screw and a nut. The nut may be connected to an exterior surface of the lower cover. Further, the circular blade may include a through-hole ("second through-hole") at a center portion of the circular blade. During the assembling process of the apparatus, the screw may pass through the second through-hole of the circular blade and the first through-hole of the lower cover (via an interior surface of the lower cover), and then attach to the nut (which, as described above, is connected to the exterior surface of the lower cover). In this manner, the screw connects the circular blade with the lower cover.

Further, an exterior surface of the screw connects to an inner wall of the bearing. During operation, when a user uses the apparatus and applies a rotatory force on the circular blade (e.g., to cut a paper, fabric, etc. by placing the edge of the blade on the paper/fabric and rotating the circular blade), the screw applies a tangential force on the inner wall of the bearing, which causes the bearing to rotate (i.e., causes the inner wall of the bearing to rotate relative to its outer wall). The rotation of the bearing makes the rotatory movement of the circular blade smooth or cause the blade to spin without drag, thereby making it easier for users with physical abilities to conveniently use the apparatus.

In certain aspects, the apparatus may further include a moveable bracket having an elongated through-hole ("first elongated through-hole") and a push button. The movable bracket is disposed between the upper cover and the lower cover when the apparatus is assembled. The first elongated through-hole is disposed between the circular blade and the interior surface of the lower cover. Further, the push button is disposed in an elongated through-hole ("second elongated through-hole") of the upper cover. The push button may slide in the second elongated through-hole.

The moveable bracket may slide between a default position ("first position") and a retracted position ("second position") when the push button is slid in the second elongated through-hole. In some aspects, the apparatus may further include a spring that may be attached between the moveable bracket and the upper or lower cover. The spring may be biased to keep the moveable bracket in the default position. When the moveable bracket is in the default position, the perimeter of the movable bracket completely encloses the edges of the circular blade, thereby making the apparatus inoperable or disabling the circular blade from cutting. When the moveable bracket is in the retracted position, the perimeter of the movable bracket only partially encloses the edges of the circular blade thereby exposing at least some portion of the edges of the circular blade. In this position, the edges of the circular blade that are exposed can be used for cutting paper, fabric, etc.

Further details of the apparatus are provided below in conjunction with FIGS. 6-10.

DETAILED DESCRIPTION

Figure 1:
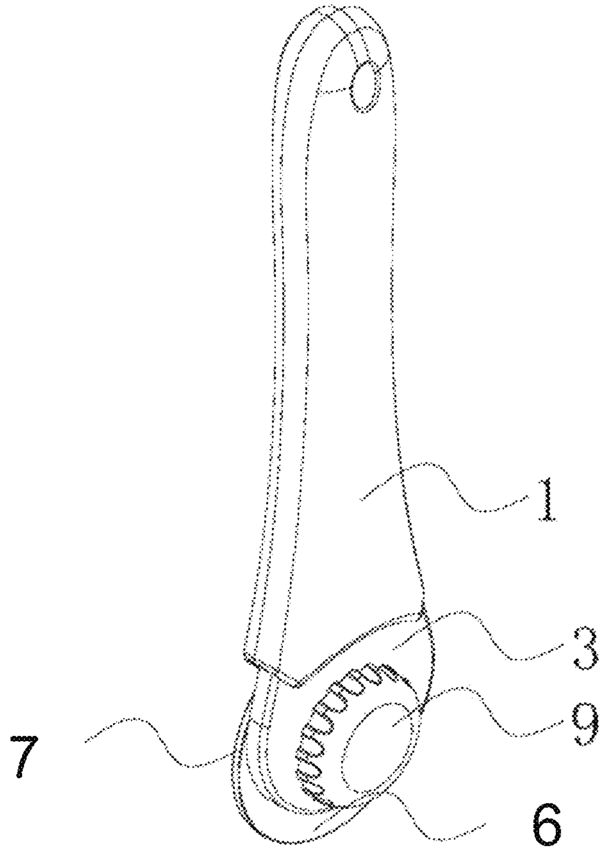
FIG. 1 is a schematic diagram of the bearing-type handle roller cutter, in accordance with one embodiment of the present disclosure.
Figure 2:
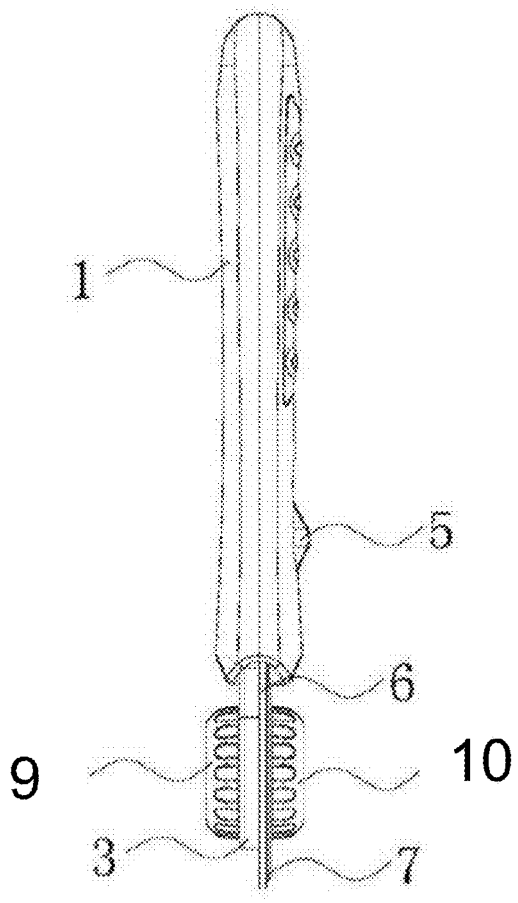
FIG. 2 is a front view of the bearing-type handle roller cutter, in accordance with one embodiment of the present disclosure.

In order to further understand the content, features, and effects of the present disclosure, the following embodiments are exemplified, and detailed descriptions are given below in conjunction with the accompanying drawings.

The features of the present disclosure will be described in detail below in conjunction with the accompanying drawings.

FIGS. 1 through 5 show a bearing-type handle roller cutter comprising a handle body 1, in accordance with embodiments of the present disclosure. The handle body 1 comprises a movable bracket 2. The movable bracket 2 is movably connected at an inside of the handle body 1. The bearing-type handle roller cutter comprises a fixed frame 3 positioned at the bottom of the inside or inner cavity of the handle body 1. The bearing-type handle roller cutter comprises a fixed tube 4. The fixed tube 4 is connected at a rear side of rigid frame 3. The bearing-type handle roller cutter comprises a push block 5. The push block 5 is connected at a rear side of the movable bracket 2.

Further, the movable bracket 2 comprises a protective plate or protective disk 6. The protective disk 6 is positioned at the bottom of the movable bracket 2. The protective disk 6 comprises a cutter head or cutter plate 7. The cutter head 7 is movably connected to the protective disk 6 at a front side of protective disk 6. The cutter head 7 comprises a bearing 8. The bearing 8 connects to the cutter head 7 at a rear side of the cutter head 7. The rear side of the bearing 8 extends and runs through an inner cavity of the fixed tube 4. Here, an outer ring of the bearing 8 is fixedly connected with the cutter head 7. Further, the front side of the rigid frame 3 is movably connected with a first fixed cap 9, and a rear side of the protective disk 6 is movably connected to a second fixed cap 10.

Figure 5:
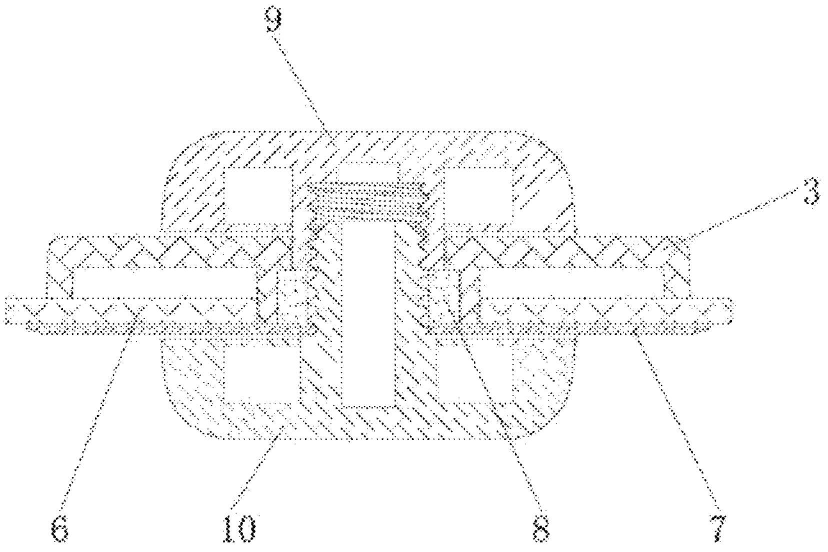
FIG. 5 is a bottom cross-sectional view of the handle body, in accordance with one embodiment of the present disclosure.

Referring to FIG. 5, the first fixed cap 9 and the second fixed cap 10 both extend from the opposite sides of the inner ring of the bearing 8 and are movably connected by threads is shown, in accordance with one embodiment of the present disclosure.

The bearing 8 and the cutter head 7 are secured with the help of the first fixed cap 9 and the second fixed cap 10. The cutter head 7 is installed or removed by disassembling/uninstalling the first fixed cap 9 and the second fixed cap 10.

Figure 3:
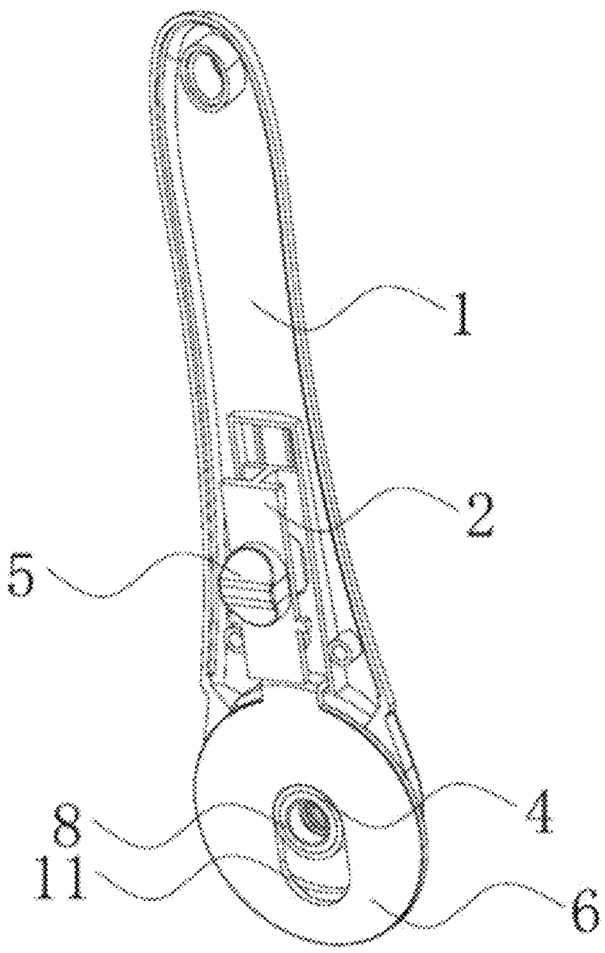
FIG. 3 is a schematic diagram of the internal structure of the handle body, in accordance with one embodiment of the present disclosure.

Referring to FIG. 3, the bearing-type handle roller cutter comprising a moving hole 11 is shown. The moving hole 11 positions at the rear side of the protective disk 6 and the fixed tube 4. The rear side of the fixed tube 4 passes through the moving hole 11 and extends to the rear side of the protective disk 6.

The moving hole 11 is provided to limit/present a moving range for the protective disk 6 such that the protective disk 6 does not get stuck/jammed during the operation.

Figure 4:
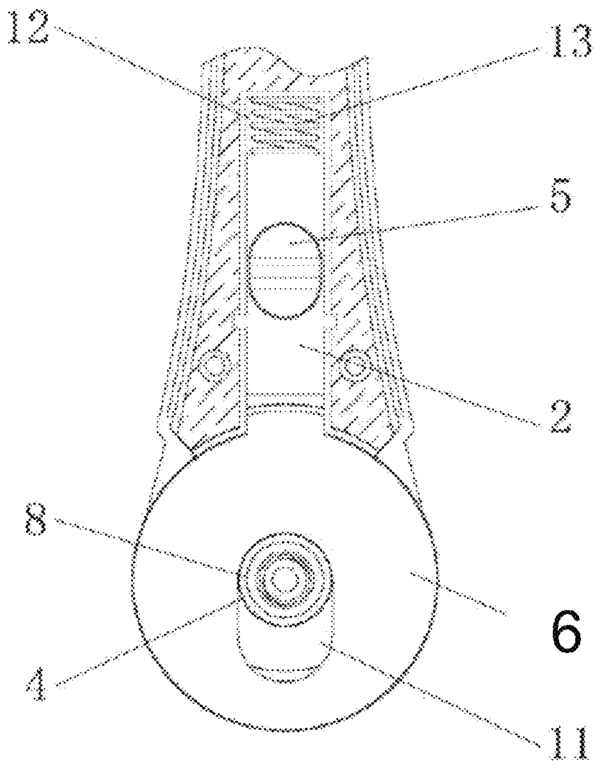
FIG. 4 is a partial rear cross-sectional view of the handle body, in accordance with one embodiment of the present disclosure.

Referring to FIG. 4, the handle body 1 comprising a movable hole 12 is shown. The movable hole 12 positions at the rear side of the handle body 1 and helps in operating the movable bracket 2. Here, the rear side of the movable bracket 2 passes through the movable hole 12 and extends to the rear side of the handle body 1.

The movable hole 12 receives the movable bracket 2. In operation, the push block 5 is pushed to move the movable bracket 2 within the movable hole 12. The movable bracket 2 moves smoothly in the movable hole 12 and facilitates in adjusting the position of the protective disk 6.

Referring to FIG. 4, the movable bracket 2 comprising a spring 13 at the top is shown. The spring 13 positions in the movable hole 12 and one end of the spring 13 connects to the movable bracket 2.

The spring 13 allows the movable bracket 2 to drive along the movable hole 12. Here, the movable bracket 2 drives or pushes the spring 13 to undergo elastic deformation. The deformation of the spring 13 drives the movable bracket 2 to automatically reset, which in turn automatically resets the cutter head 7 to ensure that the cutter head 7 is not touched accidentally, thereby improving the safety.

In use, a user pushes the push block 5. Here, the push block 5 drives the movable bracket 2 to move synchronously. The movable bracket 2 drives the spring 13 to undergo elastic deformation. Concurrently, the movable bracket 2 drives the protective disk 6 to move until the cutter head 7 is exposed outside of the protective disk 6 and can be used for cutting. In addition, when the cutter head 7 is cutting, the cutter head 7 drives the outer ring of the bearing 8 to rotate. After the cutting is finished, the push block 5 is released such that the spring 13 drives the movable bracket 2 to reset, achieving the purpose of automatic reset of the protective disk 6 and protecting the cutter head 7 from being exposed. This improves the safety and convenience of the users to use the bearing-type handle roller cutter.

In summary: the bearing-type handle roller cutter comprising the handle body 1, the push block 5, the spring 13, the bearing 8, the protective disc 6 and the cutter head 7; and the cutter head 7 can be exposed for cutting by pushing the push block 5. The cutter head 7 is automatically reset and protected with the help of the spring 13.

The described embodiments of the present disclosure remedy the deficiencies of conventional cutters by structurally rotating and translating force through the friction between the blade and the handle shaft. Because users may use the cutter in various positions with different levels of strength and force, the degree of friction and natural wear between the blade and the screw rod is minimized. Further, the friction on the screw rod may increase the service life of the handle knife and increase cutting accuracy, which may reduce material waste caused by miscuts.

Figure 6:
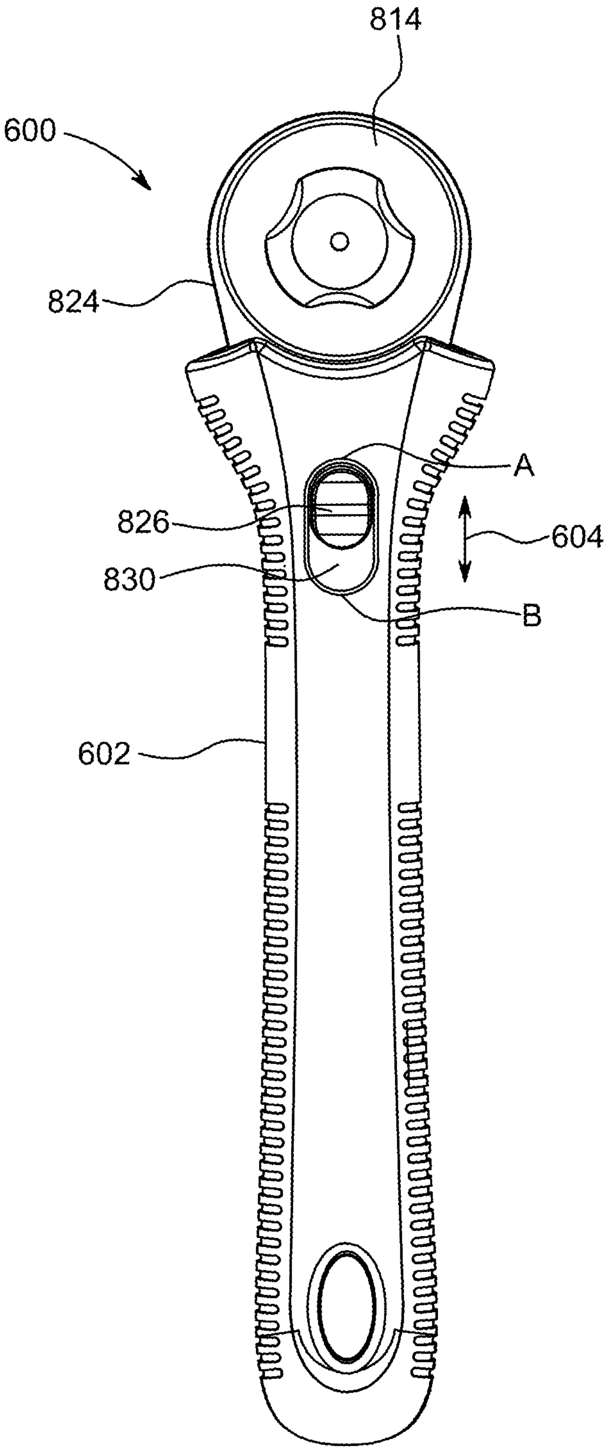
FIG. 6 depicts a bearing-type handle roller cutter in a default position, in accordance with one embodiment of the present disclosure.

FIG. 6 depicts a bearing-type handle roller cutter 600 (or an apparatus 600) in a default position, in accordance with one embodiment of the present disclosure. The apparatus 600 may be similar to the bearing-type handle roller cutter described above; however, the apparatus 600 may include one or more additional and/or different elements, as described below. FIG. 6 will be described in conjunction with FIGS. 7, 8, 9 and 10.

Figure 7:
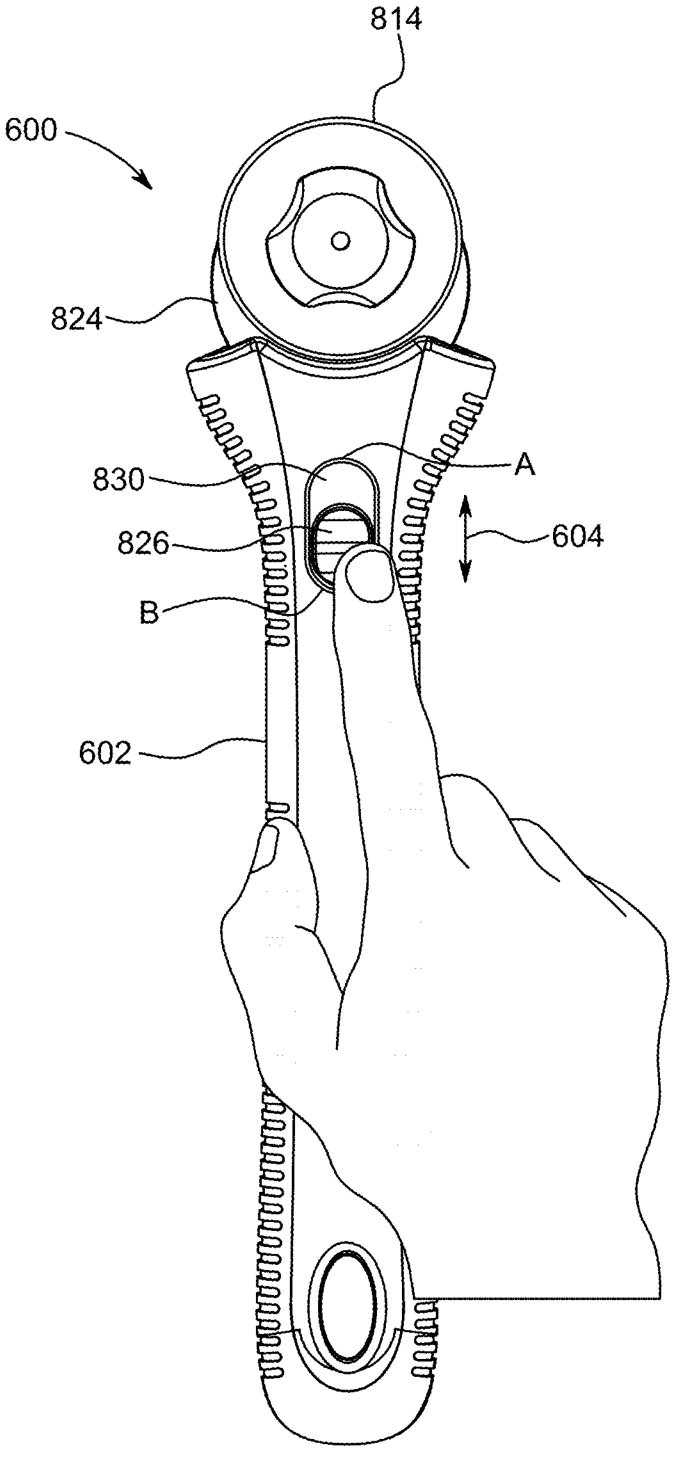
FIG. 7 depicts a bearing-type handle roller cutter in an retracted position, in accordance with one embodiment of the present disclosure.
Figure 8:
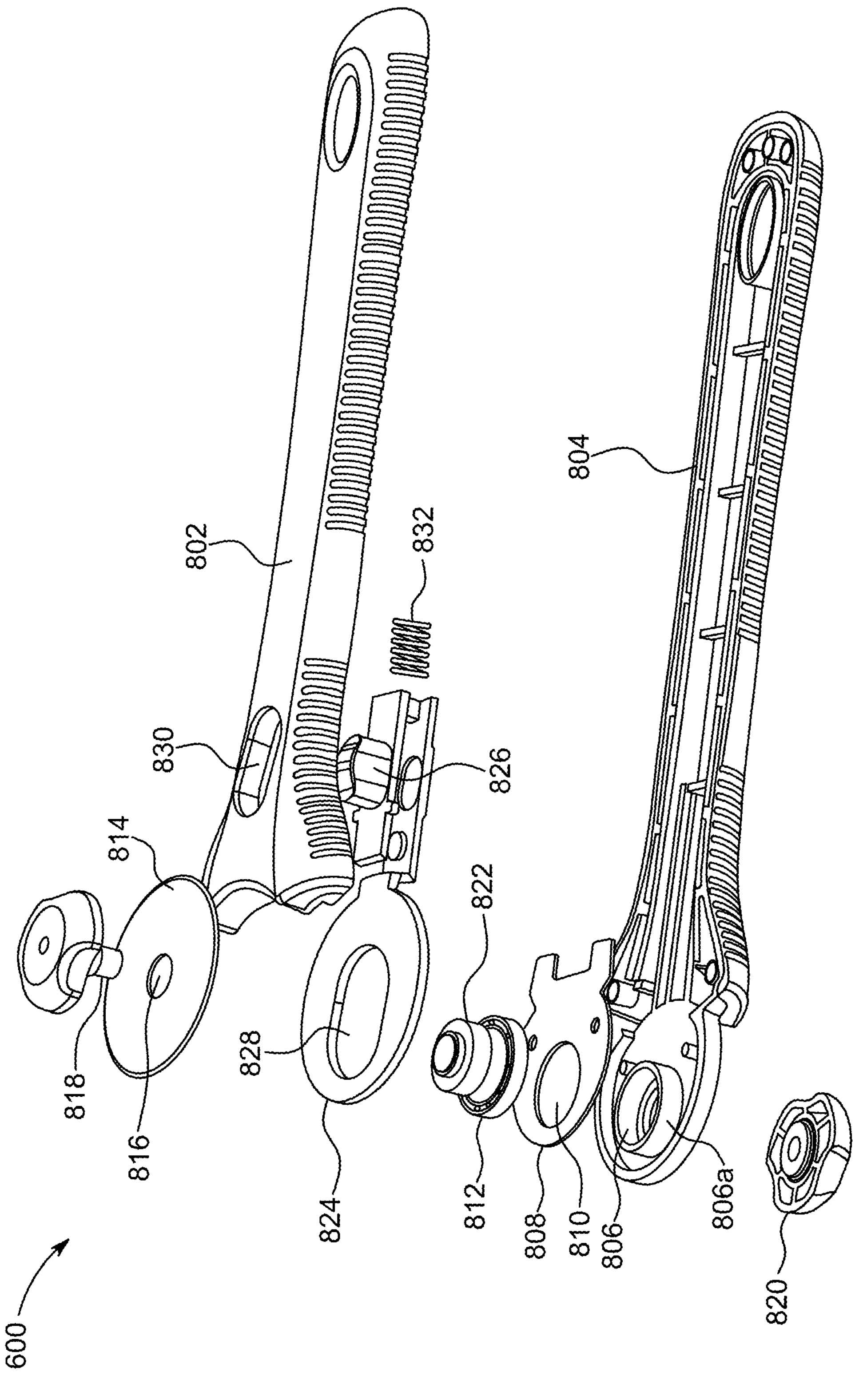
FIG. 8 depicts an exploded view of a bearing-type handle roller cutter, in accordance with one embodiment of the present disclosure.
Figure 9:
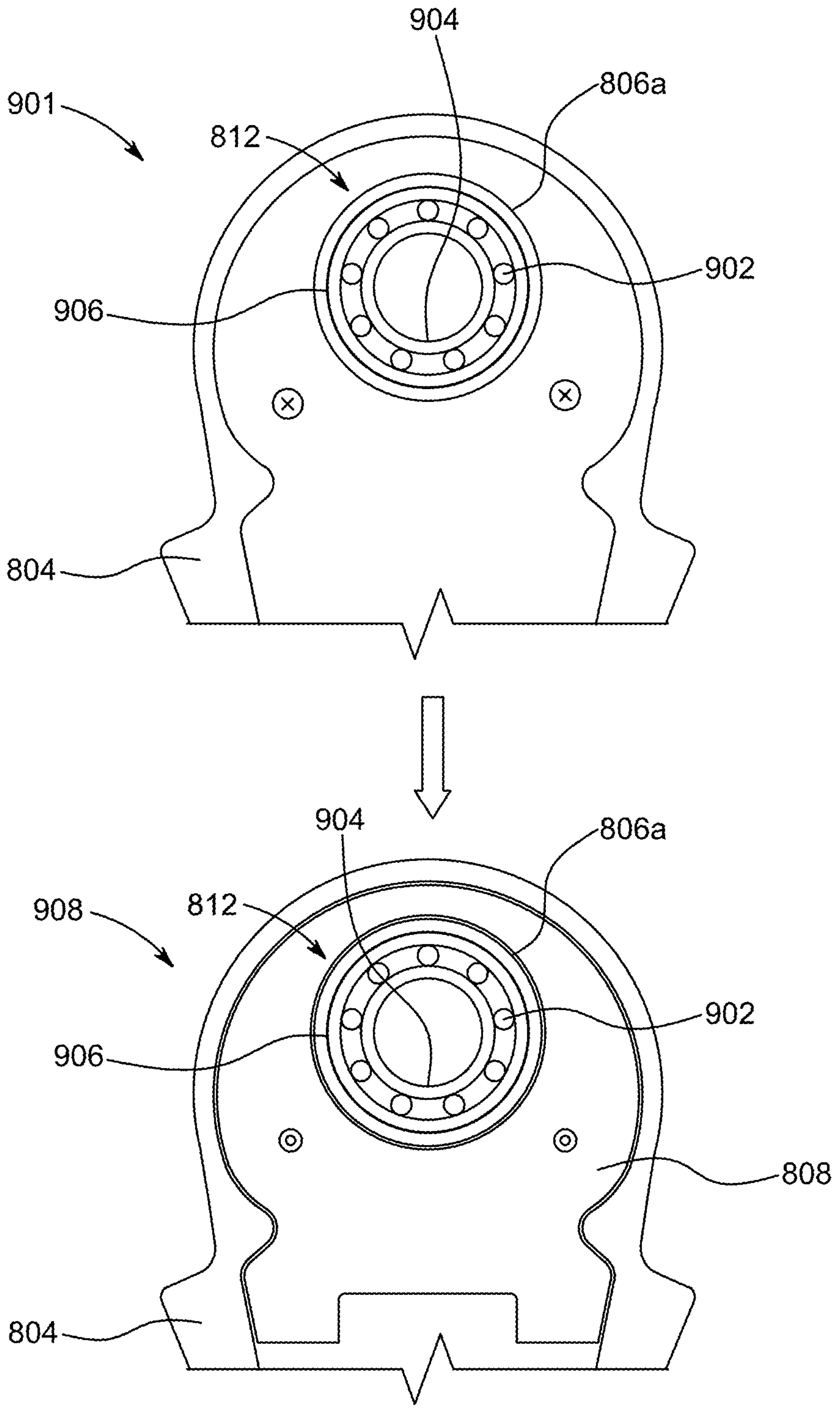
FIG. 9 depicts views of a bearing of a bearing-type handle roller cutter, in accordance with one embodiment of the present disclosure.

The apparatus 600 may include a handle body 602 including an upper cover 802 and a lower cover 804 (shown in FIG. 8). The handle body 602 may be made of plastic or any other material. The upper cover 802 and the lower cover 804 may be connected or attached to each other via one or more fasteners (not shown) or via interference or friction fit during the apparatus'assembling process, to form the handle body 602 depicted in FIGS. 6 and 7. As shown in FIG. 8, both the upper cover 802 and the lower cover 804 may have similar elongated structures of their distal portions. A proximal portion of the lower cover 804 may include a first through hole 806 (while corresponding proximal portion of the upper cover 802 may not include any material/body, as shown in FIG. 8).

In an exemplary aspect, the first through-hole 806 may be circular in shape and the perimeter/circumference of the first through hole 806 may include protruding walls **806*a*, such that a tube-like structure may be formed around the first through hole 806. The apparatus 600 may further include a rigid plate 808 that may be attached to the proximal portion of an interior surface of the lower cover 804. The rigid plate 808 may include a second through-hole 810 that encircles the first through-hole 806 (or the protruding walls 806*a*) when the apparatus 600 is assembled. In some aspects, the diameters of the second through-hole 810 and the first through-hole 806 (specifically the protruding walls 806*a*) may be the same or similar, so that the rigid plate 808 may conveniently slide over the protruding walls 806*a* and lay flush with the interior surface of the lower cover 804 when the apparatus 600 is assembled. In some aspects, the rigid plate 808 provides rigidity to the structure of the lower cover 804 and ensures that the proximal portion of the lower cover 804 does not break when the apparatus 600 is operated or when pressure is applied to the proximal portion of the lower cover 804**.

The apparatus 600 may further include a bearing 812 that may be disposed or enclosed in the first through-hole 806. The bearing 812 may be a deep groove ball bearing including a plurality of balls 902 disposed between an inner wall 904 and an outer wall 906 of the bearing 812 (as shown in a view 901 of FIG. 9). The inner wall 904 rotates relative to the outer wall 906 when the balls 902 roll inside the area between the inner wall 904 and the outer wall 906. The inner wall 904 rotates relative to the outer wall 906 when a tangential force is applied to the inner wall 904, as described later below.

In some aspects, the outer wall 906 of the bearing 812 may be placed inside and connected to the protruding walls **806*a* of the first through hole 806 (e.g., via interference fit) when the apparatus 600 is assembled, as shown in the view 901. The outer wall 906 may be tightly connected or pressed against the protruding walls 806*a* so that the outer wall 906 does not rotate relative to the protruding walls 806*a* when the apparatus 600 is operated. In an exemplary aspect, during the assembly process of the apparatus 600, the bearing 812 is first connected to the protruding walls 806*a* of the first through hole 806 (as shown in the view 901), and then the rigid plate 808 is placed over the protruding walls 806*a* so that the rigid plate 808 may lay flush with the interior surface of the lower cover 804, as shown in a view 908 of FIG. 9**.

The apparatus 600 may further include a circular blade 814 including a third through-hole 816 at a center portion of the circular blade 814. The circular blade 814 faces the interior surface of the lower cover 804. The apparatus 600 further includes a screw assembly having a screw 818 and a nut 820 (each having respective caps, as shown in FIG. 8). The nut 820 is disposed at the proximal portion of the exterior surface of the lower cover 804 (which is away from the circular blade 814) and covers the first through-hole 806 from behind. During the assembly process of the apparatus 600, the screw 818 passes through the third through-hole 816 of the circular blade 814, the first through-hole 806 of the lower cover 804, and then attaches to the nut 820. In some aspects, the screw 818 is tightly connected to the circular blade 814.

Figure 10:
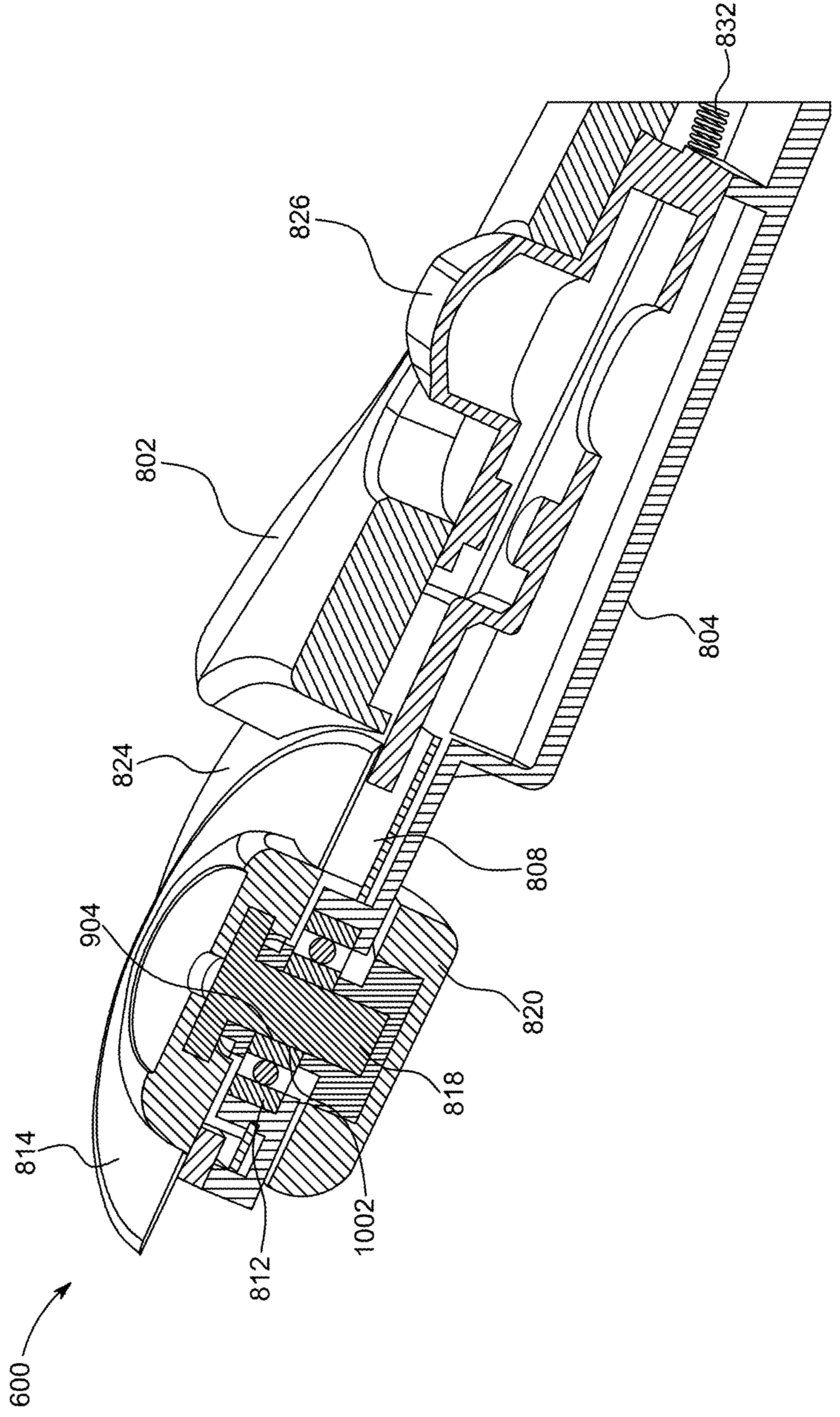
FIG. 10 depicts a cross-sectional view of a bearing-type handle roller cutter in an assembled state, in accordance with one embodiment of the present disclosure.

When the screw 818 passes through the first through-hole 806 of the lower cover 804, an exterior surface 1002 of the screw 818 tightly touches or connects to the inner wall 904 of the bearing 812 (as shown in FIG. 10). This arrangement enables the screw 818 to transfer the axial forces acting on the screw 818 to the inner wall 904 of the bearing 812. Specifically, when axial forces act on the screw 818, the exterior surface 1002 of the screw 818 applies a tangential force on the inner wall 904 of the bearing 812 causing the inner wall 904 to rotate relative to the outer wall 906. More specifically, when the circular blade 814 is rotated, it causes the screw 818 to rotate since the circular blade 814 is tightly connected to the screw 818. When the screw 818 rotates, it applies a tangential force on the inner wall 904 of the bearing 812 causing the inner wall 904 to rotate relative to the outer wall 906, thereby causing the bearing 812 to spin.

In certain aspects, the apparatus 600 may further include a bearing seal 822 that may be placed over the bearing 812 (and on the interior surface of the lower cover 804). The bearing seal 822 may act as a dust cover and a seal that ensures that the bearing 812 does not come out when the apparatus 600 is used by a user.

The apparatus 600 may further include a movable bracket disposed between the upper cover 802 and the lower cover 804. The movable bracket may include a circular protective cover 824 and a push button 826. The protective cover 824 may be present on the proximal portion of the movable bracket and the push button 826 may be present on the distal portion of the movable bracket. The protective cover 824 may be circular in shape, with its diameter slightly greater than a diameter of the circular blade 814. The protective cover 824 may include an elongated fourth through-hole 828, whose length may be greater than a diameter of the third through-hole 816 of the circular blade 814.

The protective cover 824 may be disposed between the circular blade 814 and the interior surface of the lower cover 804. Specifically, when the apparatus 600 is assembled, an upper surface of the protective cover 824 may touch a lower surface of the circular blade 814, and a lower surface of the protective cover 824 may touch an upper surface of the rigid plate 808 (that touches the interior surface of the lower cover 804).

The push button 826 may slide in an elongated fifth through-hole 830 of the upper cover 802. Specifically, the push button 826 may be slid in a right or left direction (or up or down direction based on the orientation of the apparatus 600, as shown by arrows 604 in FIG. 6). The movable bracket (including the protective cover 824) moves between a default position (or "first position", shown in FIG. 6) and a retracted position (or "second position", shown in FIG. 7) when the push button 826 is slid in the elongated fifth through-hole 830. Specifically, the movable bracket is in the default position when the push button 826 is in a proximal position "A" of the elongated fifth through-hole 830 as shown in FIG. 6, and is in the retracted position when the push button 826 is in a distal position "B" of the elongated fifth through-hole 830 as shown in FIG. 7.

In some aspects, the perimeter or circumference of the protective cover 824 of the movable bracket completely encloses the edges of the circular blade 814 when the movable bracket is in the default position, as shown in FIG. 6. In the default position, since the edges of the circular blade 814 are completed enclosed by the protective cover 824 and hence not exposed, the circular blade 814 cannot cut any surface or harm a user (e.g., cannot cut or harm user's skin). On the other hand, the perimeter or circumference of the protective cover 824 of the movable bracket only partially encloses the edges of the circular blade 814 when the movable bracket is in the retracted position, thereby exposing at least some portion of the edges of the circular blade 814, as shown in FIG. 7. Specifically, when the movable bracket is in the retracted position, the proximal portion of the edges of the circular blade 814 is exposed as the protective cover 824 "retracts" backwards inside the handle body 602. A user may use or operate the apparatus 600 for cutting paper, fabric, etc. by moving the movable bracket to the retracted position.

In certain aspects, the apparatus 600 may further include a spring 832 that may be connected between a distal end of the movable bracket and the interior surface of the upper cover 802 and/or the lower cover 804. The spring 832 may be biased to be stretched and keep the movable bracket in the default position.

During operation, the user may first slide the push button 826 from the proximal position "A" to the distal position "B" to move the movable bracket from the default position to the retracted position. As described above, when the movable bracket is in the retracted position, the proximal portion of the edges of the circular blade 814 gets exposed as the protective cover 824 retracts backwards inside the handle body 602. At this point, the user may place the "exposed" edges of the circular blade 814 on a paper, fabric, etc. that needs to be cut, and then apply a downward and forward pressure to rotate the circular blade 814. When the circular blade 814 rotates, it rotates the screw 818. The rotating screw 818 applies a tangential force on the inner wall 904 of the bearing 812, which causes the inner wall 904 to spin relative to the outer wall 906 of the bearing 812. When the bearing 812 spins, it enables the circular blade 814 to rotate smoothly on the paper/fabric without any drag, thereby enabling the user to conveniently cut the paper/fabric without having to apply substantial pressure/force. In this manner, the apparatus 600 enables physically disabled users (e.g., users with hand injury, arthritis, old people, and/or the like) to conveniently use the apparatus 600 to cut paper, fabric, etc. Furthermore, since the bearing 812 enables the circular blade 814 to rotate efficiently with less amount of pressure/force, the circular blade 814 experiences less damage and wear and tear over time, leading to longer life of the circular blade 814. In addition, applying less pressure/force results in less strain on the user's wrist, and hence enhances the user's convenience of operating the apparatus 600.

It should be noted that in this description, relational terms such as first and second are only used to distinguish one entity or operation from another entity or operation, and without necessarily requiring or implying one of these entities or operations. Further, the terms "including", "comprising", "comprise", "include" or any other variants thereof are intended to cover non-exclusive inclusions, so that a process, method, article or device including a series of elements not only includes those elements, but also includes those that are not explicitly listed Other elements of, or also include elements inherent to this process, method, article or equipment.

Although the embodiments of the present disclosure have been shown and described, those of ordinary skill in the art can understand that various changes and modifications can be made to these embodiments without departing from the scope and spirit of the present disclosure. Replacements and modifications, the scope of the present disclosure is defined by the appended claims and their equivalents.

That which is claimed is:

1. An apparatus comprising:

a handle body comprising an upper cover and a lower cover, wherein the upper cover and the lower cover are configured to attach with each other, and wherein a first portion of the lower cover comprises a first through-hole;

a bearing configured to be disposed in the first through-hole, wherein the bearing comprises an inner wall and an outer wall configured to rotate relative to each other, and wherein the outer wall of the bearing is connected to a wall of the first through-hole;

a circular blade comprising a second through-hole at a center portion of the circular blade;

a screw assembly comprising a screw and a nut, wherein:

the screw is configured to pass through the second through-hole and the first through-hole, and attach to the nut;

an exterior surface of the screw connects to the inner wall of the bearing; and the screw applies a tangential force on the inner wall of the bearing causing the inner wall to rotate relative to the outer wall when the circular blade is rotated; and a rigid plate attached to the first portion of the lower cover, wherein the rigid plate comprises a third through-hole that encircles the first through-hole in which the bearing is disposed, and wherein the rigid plate provides rigidity to a structure of the lower cover.

2. The apparatus of claim 1 further comprising a bearing seal configured to be placed over the bearing and on an interior surface of the lower cover.

3. The apparatus of claim 1 further comprising a movable bracket having an elongated fourth through-hole and a push button, wherein the movable bracket is disposed between the upper cover and the lower cover, and wherein the elongated fourth through-hole is present on a first portion of the movable bracket and the push button is present on a second portion of the movable bracket.

4. The apparatus of claim 3, wherein the elongated fourth through-hole is disposed between the circular blade and an interior surface of the lower cover.

5. The apparatus of claim 4, wherein a length of the elongated fourth through-hole is greater than a diameter of the second through-hole.

6. The apparatus of claim 4, wherein the upper cover comprises an elongated fifth through-hole, and wherein the push button is configured to slide in the elongated fifth through-hole.

7. The apparatus of claim 6, wherein the movable bracket is configured to slide between a first position and a second position when the push button is slid in the elongated fifth through-hole.

8. The apparatus of claim 7, wherein a perimeter of the first portion of the movable bracket completely encloses edges of the circular blade when the movable bracket is in the first position, and wherein the perimeter of the first portion of the movable bracket partially encloses the edges of the circular blade when the movable bracket is in the second position thereby exposing at least some portion of the edges of the circular blade.

9. The apparatus of claim 8 further comprising a spring connected between a second end of the movable bracket and an interior surface of the upper cover or the lower cover, and wherein the spring is configured to keep the movable bracket in the first position as a default position of the movable bracket.

10. The apparatus of claim 1, wherein the screw and the nut extend into the inner wall of the bearing.

11. An apparatus comprising:

a handle body comprising an upper cover and a lower cover, wherein the upper cover and the lower cover are configured to attach with each other, and wherein a first portion of the lower cover comprises a first through-hole;

a bearing configured to be disposed in the first through-hole, wherein the bearing comprises an inner wall and an outer wall configured to rotate relative to each other, and wherein the outer wall of the bearing is connected to a wall of the first through-hole;

a circular blade comprising a second through-hole at a center portion of the circular blade;

a screw assembly comprising a screw and a nut, wherein:

the nut is disposed at the first portion of an exterior surface of the lower cover and covers the first through-hole, the circular blade faces an interior surface of the lower cover, the screw is configured to pass through the second through-hole and the first through-hole, and attach to the nut;

an exterior surface of the screw connects to the inner wall of the bearing;

the screw applies a tangential force on the inner wall of the bearing causing the inner wall to rotate relative to the outer wall when the circular blade is rotated; and a rigid plate attached to the first portion of an interior surface of the lower cover, wherein the rigid plate comprises a third through-hole that encircles the first through-hole in which the bearing is disposed, and wherein the rigid plate provides rigidity to a structure of the lower cover.

12. The apparatus of claim 11 further comprising a movable bracket having an elongated third through-hole and a push button, wherein the movable bracket is disposed between the upper cover and the lower cover, and wherein the elongated third through-hole is present on a first portion of the movable bracket and the push button is present on a second portion of the movable bracket.

13. The apparatus of claim 12, wherein the elongated third through-hole is disposed between the circular blade and an interior surface of the lower cover.

14. The apparatus of claim 13, wherein the upper cover comprises an elongated fourth through-hole, and wherein the push button is configured to slide in the elongated fourth through-hole.

15. The apparatus of claim 14, wherein the movable bracket is configured to slide between a first position and a second position when the push button is slid in the elongated fourth through-hole.

16. The apparatus of claim 15, wherein a perimeter of the first portion of the movable bracket completely encloses edges of the circular blade when the movable bracket is in the first position, and wherein the perimeter of the first portion of the movable bracket partially encloses the edges of the circular blade when the movable bracket is in the second position thereby exposing at least some portion of the edges of the circular blade.

17. The apparatus of claim 16 further comprising a spring connected between a second end of the movable bracket and an interior surface of the upper cover or the lower cover, and wherein the spring is configured to keep the movable bracket in the first position as a default position of the movable bracket.

18. An apparatus comprising:

a handle body comprising an upper cover and a lower cover, wherein the upper cover and the lower cover are configured to attach with each other, and wherein a first portion of the lower cover comprises a first through-hole;

a bearing configured to be disposed in the first through-hole, wherein the bearing comprises an inner wall and an outer wall configured to rotate relative to each other, wherein the outer wall of the bearing is connected to a wall of the first through-hole, wherein the bearing is a ball bearing comprising a plurality of balls disposed between the inner wall and the outer wall, and wherein the inner wall rotates relative to the outer wall when the plurality of balls rolls inside an area between the inner wall and the outer wall;

a circular blade comprising a second through-hole at a center portion of the circular blade;

a screw assembly comprising a screw and a nut, wherein:

the screw is configured to pass through the second through-hole and the first through-hole, and attach to the nut;

an exterior surface of the screw connects to the inner wall of the bearing; and the screw applies a tangential force on the inner wall of the bearing causing the inner wall to rotate relative to the outer wall when the circular blade is rotated; and a rigid plate attached to the first portion of the lower cover, wherein the rigid plate comprises a third through-hole that encircles the first through-hole in which the bearing is disposed, and wherein the rigid plate provides rigidity to a structure of the lower cover.

* * * * *